United States Patent
Coatney et al.

(10) Patent No.: US 7,529,982 B1
(45) Date of Patent: May 5, 2009

(54) METHOD AND AN APPARATUS FOR AGGRESSIVELY DETECTING MEDIA ERRORS ON STORAGE DEVICES WITH NEGLIGIBLE PERFORMANCE IMPACT

(75) Inventors: Douglas W. Coatney, Cupertino, CA (US); Atul Goel, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 11/890,611

(22) Filed: Aug. 6, 2007

Related U.S. Application Data

(63) Continuation of application No. 10/836,914, filed on Apr. 30, 2004, now Pat. No. 7,278,067.

(51) Int. Cl.
*G06F 11/00* (2006.01)

(52) U.S. Cl. ..................................... 714/54

(58) Field of Classification Search .................. 714/54, 714/52; 707/200; 711/114
See application file for complete search history.

(56) References Cited

U.S. PATENT DOCUMENTS

| | | | | |
|---|---|---|---|---|
| 5,632,012 A * | 5/1997 | Belsan et al. | ................... | 714/6 |
| 5,978,952 A * | 11/1999 | Hayek et al. | ................ | 714/764 |
| 6,101,614 A * | 8/2000 | Gonzales et al. | ............... | 714/6 |
| 6,848,063 B2 * | 1/2005 | Rodeheffer et al. | ............ | 714/6 |
| 7,017,107 B2 * | 3/2006 | Talagala et al. | ............. | 714/819 |
| 7,137,038 B2 * | 11/2006 | New et al. | ...................... | 714/42 |
| 2003/0009623 A1 * | 1/2003 | Arimilli et al. | .............. | 711/119 |
| 2006/0129759 A1 * | 6/2006 | Bartlett et al. | .............. | 711/114 |
| 2006/0129996 A1 | 6/2006 | Armstrong et al. | | |
| 2006/0218199 A1 * | 9/2006 | Kishi | ......................... | 707/200 |

OTHER PUBLICATIONS

Watson, Andy, "Optimizing Data Availability with the NetApp F540", Apr. 16, 2004, http://www.netapp.com/tech_library/3013.html?fmt=print. 8 pages.
Marchi, Michael J., et al., "The Network Appliance Enterprise Storage Architecture: System and Data Availability", NetApp, Technical Report, 13 pages.
Intel, "ISCSI: The Future of Network Storage", 7 pages.
Dale, David, "ISCSI: Accelerating the Transition to Network Storage", Network Appliance, Apr. 2003, TR-3241, White Paper, 10 pages.

* cited by examiner

*Primary Examiner*—Robert Beausoilel
*Assistant Examiner*—Amine Riad
(74) *Attorney, Agent, or Firm*—Blakely, Sokoloff, Taylor & Zafman LLP

(57) ABSTRACT

A method and an apparatus to aggressively detect media errors on storage devices with negligible performance impact have been disclosed. In one embodiment, the method includes computing a first data rate at or above which a scrub on a set of storage devices can be completed within a predetermined period of time, and running the scrub on the storage devices at a second data rate without interfering with the storage devices servicing client requests to access the storage devices, the second data rate being at or above the first data rate.

24 Claims, 5 Drawing Sheets

METHOD AND AN APPARATUS FOR AGGRESSIVELY DETECTING MEDIA ERRORS ON STORAGE DEVICES WITH NEGLIGIBLE PERFORMANCE IMPACT

This application is a Continuation of the prior application for "A METHOD AND AN APPARATUS FOR AGGRESSIVELY DETECTING MEDIA ERRORS ON STORAGE DEVICES WITH NEGLIGIBLE PERFORMANCE IMPACT," filed by Douglas W. Coatney et al. on Apr. 30, 2004, U.S. patent application Ser. No. 10/836,914, now U.S. Pat. No. 7,278,067 assigned to the corporate assignee of the present invention and incorporated herein by reference.

FIELD OF INVENTION

The present invention relates to storage systems, and more particularly, to detecting media errors on storage devices in a storage system.

BACKGROUND

A data storage system may include storage devices and one or more network storage servers or storage appliances. A storage server may provide services related to the organization of data on storage devices, such as disks. Some of these storage servers are commonly referred to as filers or file servers. An example of such a storage server is any of the Filer products made by Network Appliance, Inc. in Sunnyvale, Calif. The storage server may be implemented with a special-purpose computer or a general-purpose computer. Depending on the application, various data storage systems may include different numbers of storage servers.

To ensure reliable storage service, the storage devices are typically checked periodically for errors. The storage devices may include disks arranged into Redundant Array of Independent Disks (RAID) subsystems. To improve reliability of the storage system, the storage devices are scanned to check for errors (e.g., media errors, parity errors, etc.) from time to time. Such scanning may also be referred to as scrubbing or a scrub. A scrub that is scheduled to run for at a predetermined period of time at one or more predetermined times may be referred to as a fixed time scheduling scrub. A fixed time scheduling scrub stops scrubbing the storage devices in a RAID subsystem when the predetermined period of time is up, regardless of whether all storage devices in the RAID subsystem have been scrubbed or not. A scrub that scans through all storage devices in a system is typically referred to as a full scrub.

In one existing system, the disks in a RAID subsystem are scrubbed sequentially. To scrub a disk, a storage server in the system reads data off the disk. The data is transmitted across an interconnect from the disk to the storage server. The storage server may check whether the data is read correctly. If the data is not read correctly, then there may be a media error on the disk. A media error on a disk is typically an unknown bad sector or block on the disk. Since the disk is a magnetic storage device, a flaw on the surface of the magnetic platter may cause a media error on the disk. Media errors are a common type of errors on disks and media errors may be recovered by conventional RAID technology, such as reconstructing the data in the bad sector or block affected.

Increasing disk sizes, particle imperfections, and high track densities may also increase the rate at which new media errors are developed since the last full scrub. Thus, full scrubs are demanded to complete at a faster rate. With the current deposition technology and error rates, full scans are required once within a shorter period, such as three to four days. Hence, the current weekly scrub operation may open a sizeable window during which the storage system may not be able to reconstruct data due to a media error occurring on a disk while in the reconstruction of a RAID subsystem. Furthermore, for some current scrubbings that are limited in time, some storage devices may not be scrubbed during a single scrub due to the increasing size of the disks and the limited time the current scrub is allowed to run. Thus, these storage devices have to wait for the next scrub. Consequently, there is a larger window during which these storage devices may have media errors developed, which adversely impacts the reliability of the storage services provided by the system.

Although a scrub may be allowed to run longer in order to check all storage devices in a subsystem, such a long scrub may degrade the performance of the storage system because of various reasons. One reason is that the existing scrub involves reading data from the storage devices to the storage server, which takes up valuable data transmission bandwidth in the storage system. As a result, the latency in servicing client requests (e.g., read requests, write requests, etc.) to access the storage devices increases.

Because of the limitations of scrubbing with the read operations, one current technique is to replace reads with a verify operation, such as Small Computer Interface System (SCSI) Verify, that causes the storage devices to check whether the data can be read correctly without transferring data to the storage server. Thus, in general, the verify operation has much less overhead than the read operation. However, even with verify operations, some fixed time scheduling scrubs still adversely impact the performance of a RAID subsystem by adding latency and/or impacting data throughput. Therefore, the fixed time scheduling scrubs do not scale as the number and sizes of storage devices in a storage system increase.

Besides software based approaches, one conventional hardware based approach includes causing a disk to run SCSI verify by itself. When a read operation fails, the disk may attempt to recover the data from the sector involved using error recovery mechanisms internal to the disk. These mechanisms can include retrying the read operation pursuant to a predetermined retry algorithm, repositioning the read/write head of the disk, and running error detection and correction (EDC) algorithms (also known as error correction code (ECC)). However, such internal error recovery mechanisms typically adversely impact disk read performance. If such internal error recovery mechanisms succeed in enabling the disk to respond successfully to the read request, the error is termed a "recovered error." On the other hand, if such internal error recovery mechanisms fail to enable the disk to respond successfully to the read request, the error is termed an "non-recoverable error." Non-recoverable errors are typically noted by the storage system, which may then resort to conventional RAID technology to correct the error. However, one disadvantage of such hardware approach is that the disk can correct only recoverable errors, while non-recoverable errors are not corrected, even though non-recoverable errors are typically more critical in nature than the recoverable errors.

SUMMARY

The present invention includes a method and an apparatus to aggressively detect media errors on storage devices with negligible performance impact. In one embodiment, the method includes computing a first data rate at or above which a scrub on a set of storage devices can be completed within a predetermined period of time, and running the scrub on the storage devices at a second data rate without interfering with the storage devices servicing client requests to access the storage devices, the second data rate being at or above the first data rate.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
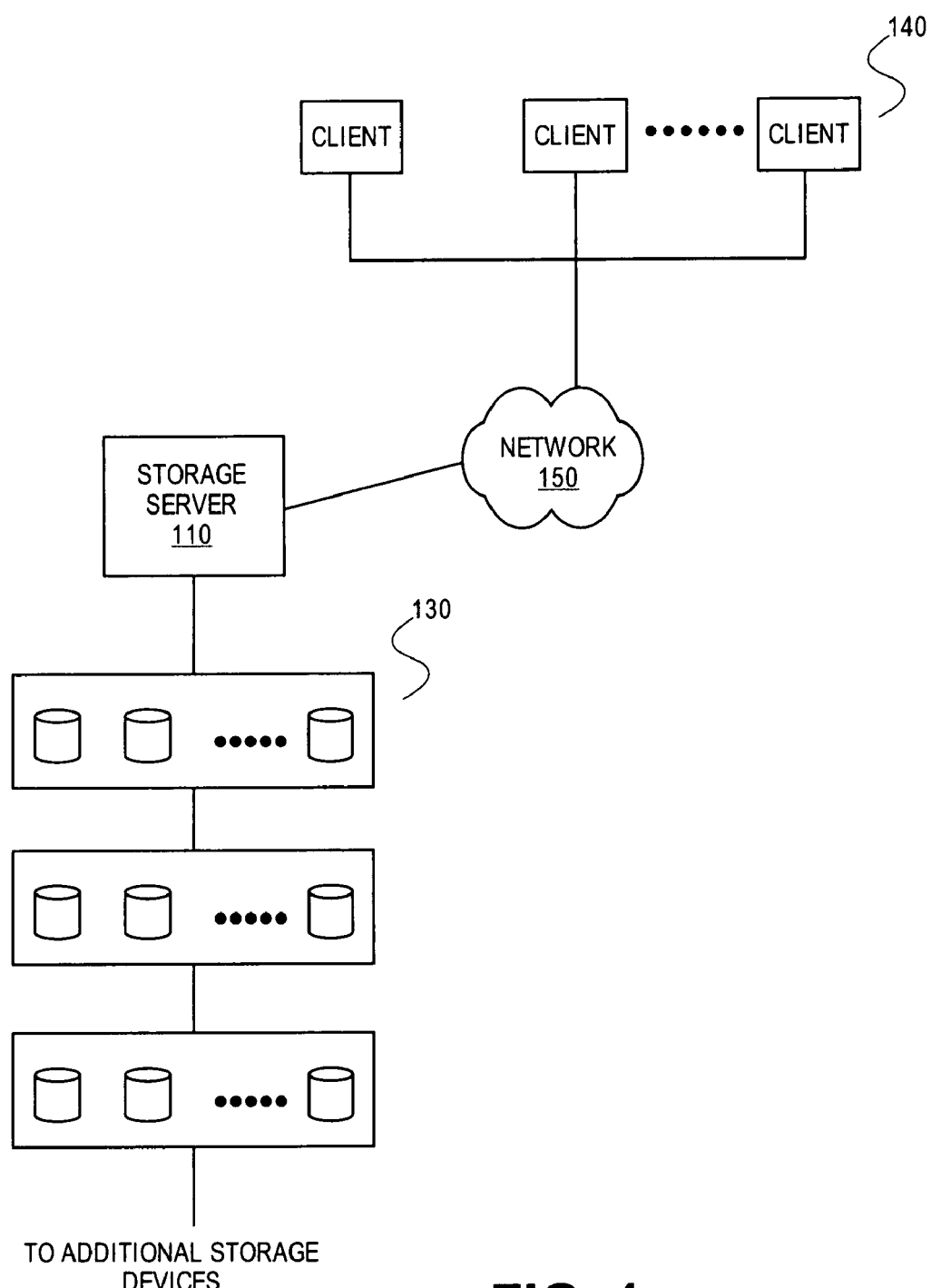
FIG. 1 illustrates an exemplary embodiment of a storage system.

A method and an apparatus to aggressively detect media errors on storage devices with negligible performance impact are described. In the following description, numerous specific details are set forth. However, it is understood that embodiments of the invention may be practiced without these specific details. In other instances, well-known components, structures, and techniques have not been shown in detail in order not to obscure the understanding of this description.

In one embodiment, a scheduling and/or throttling mechanism is used to enable scrubbing of storage devices in a storage system with negligible performance impact. In a further embodiment, SCSI verify is used in a background process to detect for media errors on the storage devices. Moreover, the background process may be run substantially continuously. Detail of various embodiments will be discussed below with reference to the figures.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 shows a data storage system useable with some embodiments of the present invention. The system 100 includes a storage server 110, a network 150, a number of storage devices 130 coupled to the storage server 110, and a number of client machines 140 coupled to the storage server 110 via the network 150. The network 150 may include a wide area network (WAN), a local area network (LAN), etc. The storage devices 130 may include a number of disks organized in shelves. The disks may include one or more Redundant Array of Independent Disks (RAID) volumes.

Note that any or all of the components of system 100 and associated hardware may be used in various embodiments of the present invention. However, it can be appreciated that other configurations of the data storage system may include some or all of the devices disclosed above.

In one embodiment, the system 100 includes a storage area network (SAN) to transmit read/write requests at the block level of the storage server 110. A block is the basic unit used to store data in the SAN. In an alternate embodiment, the system 100 is a network-attached storage (NAS) system that transmits data at the file level. In the NAS system, complete files are retrieved instead of segments on a disk. The NAS system uses file access protocols to retrieve data, such as, for example, Network File System (NFS), or Common Internet File System (CWFS). The SAN and the NAS systems may be implemented in a single server or in separate servers.

In one embodiment, the storage server 110 computes a first data rate at or above which the verification on the set of storage devices 130 can be completed within a predetermined period of time (e.g., 72 hours). A complete verification of all storage devices in a storage system may be referred to as a full scrub. Verification may be performed on the storage devices without interfering with storage service provided by the set of storage devices at or above the first data rate. In some embodiments, the rate of verification is adjusted dynamically during the scrub based on a number of criteria. Detail of some exemplary criteria is discussed below with reference to FIG. 3C.

"Verification" as used herein refers to an operation or a sequence of operations a storage device (e.g., a disk) performs to determine whether the data in one or more blocks of the storage device can be read correctly without transferring the data to a host (e.g., a storage server) over an interconnect coupling the storage device to the host. In contrast, a read operation involves the transfer of data from a block in a storage device across the interconnect to the storage server. Since no data transfer is involved in verification, verification consumes substantially less I/O bandwidth than read does. Furthermore, verification has substantially less loop utilization overheads than read. In one embodiment, the system 100 supports the SCSI protocol, which provides a verify command, SCSI_VERIFY. A storage server may issue a SCSI_VERIFY command to a storage device to cause the storage device to perform verification on the storage device. During verification, the storage device checks whether data on the storage device can be read correctly without transferring the data to the storage server. Data on the storage device may not be read correctly when there is a media error on the storage device, and thus, performing verification on the storage device may detect media errors on the storage device.

In one embodiment, a verify request is processed when there are no other requests pending in the storage server 110 such that the impact of the verification on servicing the requests from the client machines 140 may be reduced. Furthermore, the storage server 110 may compute a data rate at or above which a full scrub can be completed within a predetermined period (e.g., 72 hours) based on various parameters. The parameters may include the size of the largest storage device within the storage system, the predetermined period, and the size of the verify requests. To choose a verify request size, one may balance the cost of the request against the impact on client latency. The cost of the request refers to the amount of time the storage server 110 and the storage devices 130 take to complete the request. For instance, the time to complete the request may include the time to move a disk head from one track to another track on a platter of a disk (also referred to as the disk seek time), the time for the platter of the disk to rotate to the location where the requested data is stored (also referred to as the rotational latency), and the time spent on reading the requested data from the media in an uncached manner. In one embodiment, the verify request size is 512 k bytes, which may be equal to 128 blocks on a Fibre Channel (FC) disk.

In another embodiment, the verification rate for each storage device can be calculated based on solely the size of each storage device. In some embodiments, a verify request size of 128 blocks, i.e., 512 kbytes, may be used. In order to amortize the cost of the request, a bigger verify request size may be used.

In yet another embodiment, where detailed storage device topology information is available, a verify size substantially equal to a track length is used. One advantage here is that the storage devices supporting zero-latency access or rotational optimization may not incur any rotational delay.

In an alternate embodiment, a storage device is divided into a predetermined number of groups of blocks. A verification may be performed within the group at a location closest to the current disk head position. Progress may be monitored on a per group basis to help reducing the seek overhead on the disk.

Furthermore, to improve performance, the storage server 110 may determine how busy the storage devices 130 are and the storage server 110 may dynamically change the rate at which the storage device 130 are scrubbed accordingly. More details on the determination of how busy the storage devices 130 are and how the scrub rate is dynamically adjusted are discussed below with references to FIGS. 3A-3C.

When the storage devices 130 are less busy with servicing client requests, the storage devices may run verification without adversely impacting the latency in servicing client requests. In other words, the storage devices have some free bandwidth to run the verify requests of the scrub when they are less busy with the client requests. In some embodiments where the average disk utilization is approximately 50%, a full scrub with dynamic adjustment of scrub rate may be done roughly twice as fast as a full scrub without dynamic adjustment of scrub rate.

Furthermore, being able to verify all storage devices in each scrub allows media errors (if any) to be resolved or repaired in a timely manner. A double failure on a storage device in a redundancy group (e.g., RAID) may be caused by the discovery of media errors on the storage device during reconstruction of the redundancy group. Therefore, timely resolving media errors on the storage devices helps to prevent double failures of the storage devices during reconstruction of the RAID group.

Referring back to FIG. 1, the storage devices 130 may be organized into a RAID group. There may be two types of scrubs performed in a RAID group, namely, a parity scrub and a verify scrub. The parity scrub is performed by the storage server 110 to check for parity errors as well as media errors. In some embodiments, the storage server 110 reads data from various storage devices 130 and XOR the data to compute the corresponding parity. The storage server 110 also reads a previously computed parity from a parity disk. Then the storage server 110 verifies the parity read against the parity computed. Since the storage server 110 reads data from the storage devices 130 in order to check for parity errors, the storage server 110 is able to detect media errors as well from reading the data.

In contrast, the verify scrub is performed by the storage devices 130 to detect media errors without transferring the data to the storage server 110. Thus, the parity scrub generally takes up significantly more bandwidth than the verify scrub. Therefore, the verify scrub and the parity scrub may not be performed simultaneously in some embodiments because only one type of scrub is allowed at a given instance given a limited amount of bandwidth. Typically, the parity scrub may have a higher priority than the verify scrub because the parity scrub can correct parity errors in addition to media errors. Therefore, in some embodiments, the verify scrub is not initiated if a parity scrub is already under progress. Also, initiating a parity scrub may automatically suspend an in-progress verify scrub. After the parity scrub has stopped or is suspended, the verify scrub may resume from the block at which the verify scrub has been suspended. However, since parity errors may be relatively rare in some embodiments, the parity scrub may be performed less frequently than the verify scrub, thus reducing the overall impact on the client performance as a result of scrubbing storage devices.

Figure 2:
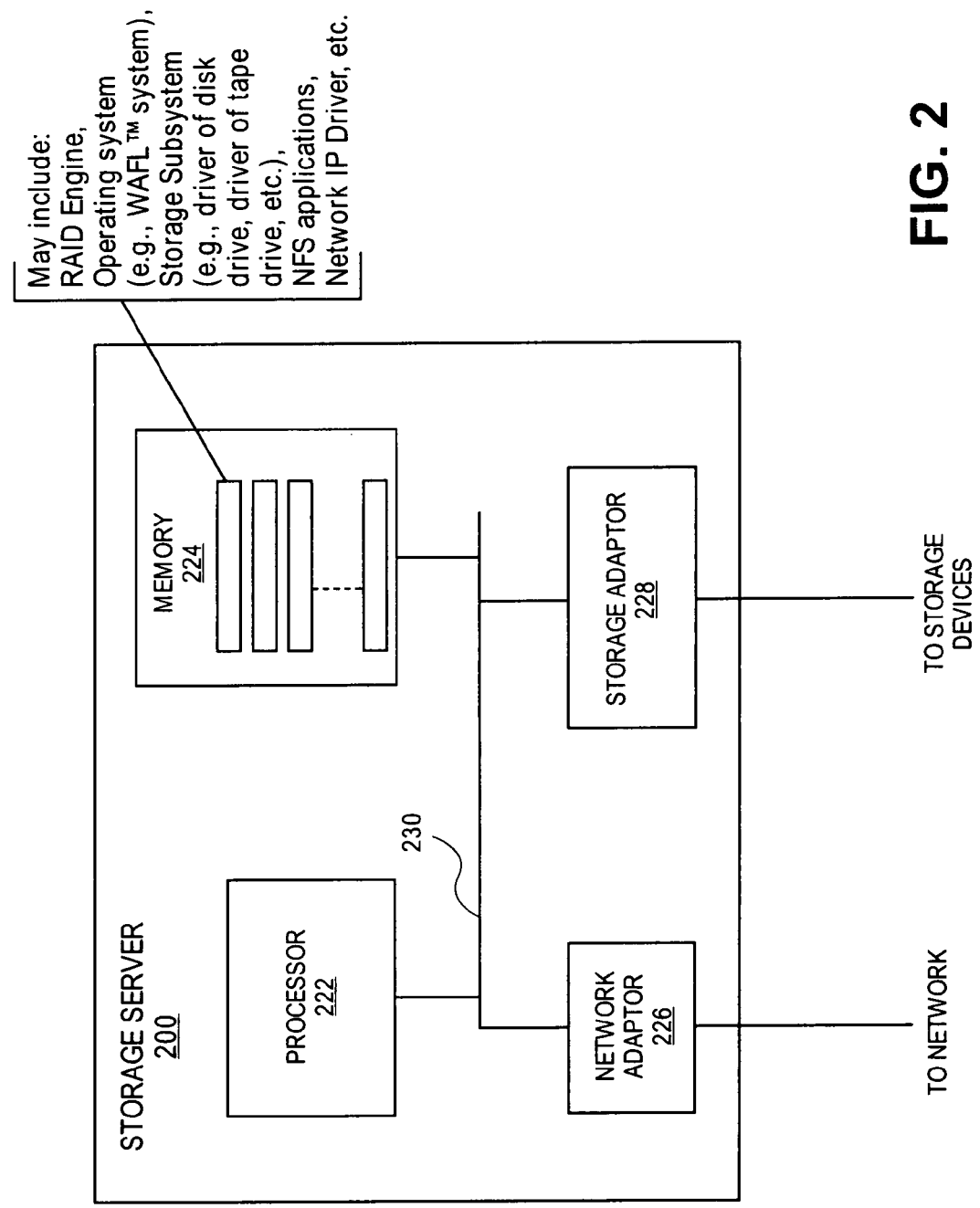
FIG. 2 illustrates one embodiment of a storage server.

FIG. 2 illustrates one embodiment of a storage server in a data storage system, such as storage server 110 in FIG. 1. The storage server 200 includes a processor 222, a memory 224, a network adaptor 226, and a storage adaptor 228, which are coupled to each other via an interconnect 230. In one embodiment, the storage server 200 is within a network and the network adaptor 226 interfaces with the network. The network may include a local area network (LAN), or a wide area network (WAN), etc. Data is transmitted between the storage server 200 and the network via the network adaptor 226. When data is received, the network adaptor 226 may forward the data to the storage adaptor 228, the memory 224, or the processor 222.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of various software running on the storage server 200, such as a RAID engine, an operating system (e.g., Write Anywhere File Layout (WAFL) system provided by Network Appliance, Inc. of Sunnyvale, Calif.), storage subsystems (e.g., driver of disk drives, driver of tape drives, etc.), Network File System (NFS) applications, Network Internet Protocol (IP) Driver, etc. The processor 222 responds to requests from client machines, the network management station, or other storage servers and organizes data on the storage devices (e.g., disks) coupled to the storage server 200. The storage server 200 interfaces with the storage devices via the storage adaptor 228.

Figure 3A:
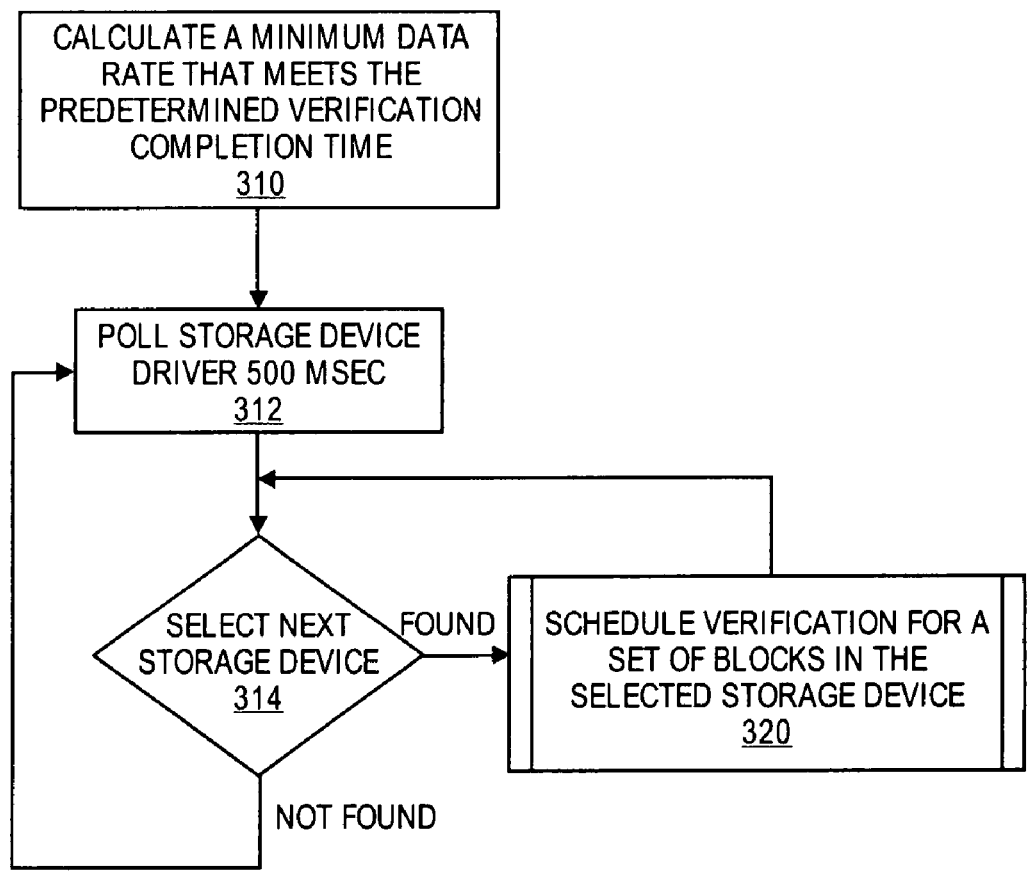
FIG. 3A is a flow diagram of one embodiment of a process to detect media errors on storage devices in a storage system.

FIG. 3A illustrates a flow diagram of one embodiment of a process to detect media errors on storage devices in a storage system. The process is performed by processing logic that may comprise hardware (e.g., circuitry, dedicated logic, etc.), software (such as is run on a general-purpose computer system or a dedicated machine, such as the storage server 200 in FIG. 2), or a combination of both. Furthermore, the technique disclosed below is applicable to various types of storage devices, such as FC disks, Advanced Technology Attachment (ATA) disks, etc.

Referring to FIG. 3A, processing logic determines a data rate at or above which the verification is performed in order to complete verification of a predetermined set of storage devices, such as all the storage devices in the storage system (processing block 310). For example, a 72 GB FC disk has 142,410,400 sectors. In order to verify all of the sectors in a predetermined period of 72 hours, 142,410,400/72*60*60=549 sectors have to be verified per second. An exemplary RAID subsystem may issue requests of 1,024 sectors each. Therefore, to maintain the rate of 549 sectors per second, a 512 kbyte verify is issued every 1,000*1,024 sectors/549 sectors/second, i.e., 1,865 msec, to complete the verification on the 72 GB disk. Hence, the first data rate in this example is one 512 kbyte verify request in every 1,865 msec. In one embodiment, the storage devices include a number of ATA disks, which are typically designed to handle smaller chunks of data than FC disks. Thus, for ATA disks, the 512 kbyte verify may be broken down into smaller verify requests, such as sixteen 32 kbyte verify requests.

Since the scheduling of verify requests may be driven by I/O requests and/or responses, the verify requests are dispatched to a driver or adaptor either when the I/O requests are received from a RAID subsystem or after the previous command from a storage server has been completed. In the absence of any I/O activity, a verify request may not be scheduled until the next I/O request is received. This may happen if the verify request has not been scheduled earlier because the storage device has been busy and the time to force verification to meet a predetermined deadline has not been reached yet. Such a delay on scheduling the verify request may be a relatively long period. To avoid a lengthy delay and in order to meet the first data rate, processing logic may periodically poll the driver and/or adaptor for pending verify requests (processing block 312) so that the pending verify requests can be scheduled promptly. How often the polling is performed may depend on the amount of processing resources in the storage system. In one embodiment, processing logic polls the storage device driver every 500 msec for pending verify requests so that the verification may not consume much processing resource in the storage system.

When a pending verify request is found, processing logic selects a next storage device for verification (processing block 314). If processing logic finds an unverified storage device, processing logic schedules verification of a set of blocks in the selected storage device (processing block 320). Note that the storage devices may not be scrubbed serially. In some embodiments, the verify requests are dispatched to the storage devices in parallel. More detail of the verification of the blocks in the selected storage device is discussed below with reference to FIG. 3B. After iterating through all unverified storage devices once, processing logic returns to processing block 312 to poll the storage device driver. Note that a storage device is considered unverified if the storage device has one or more unverified blocks.

Figure 3B:
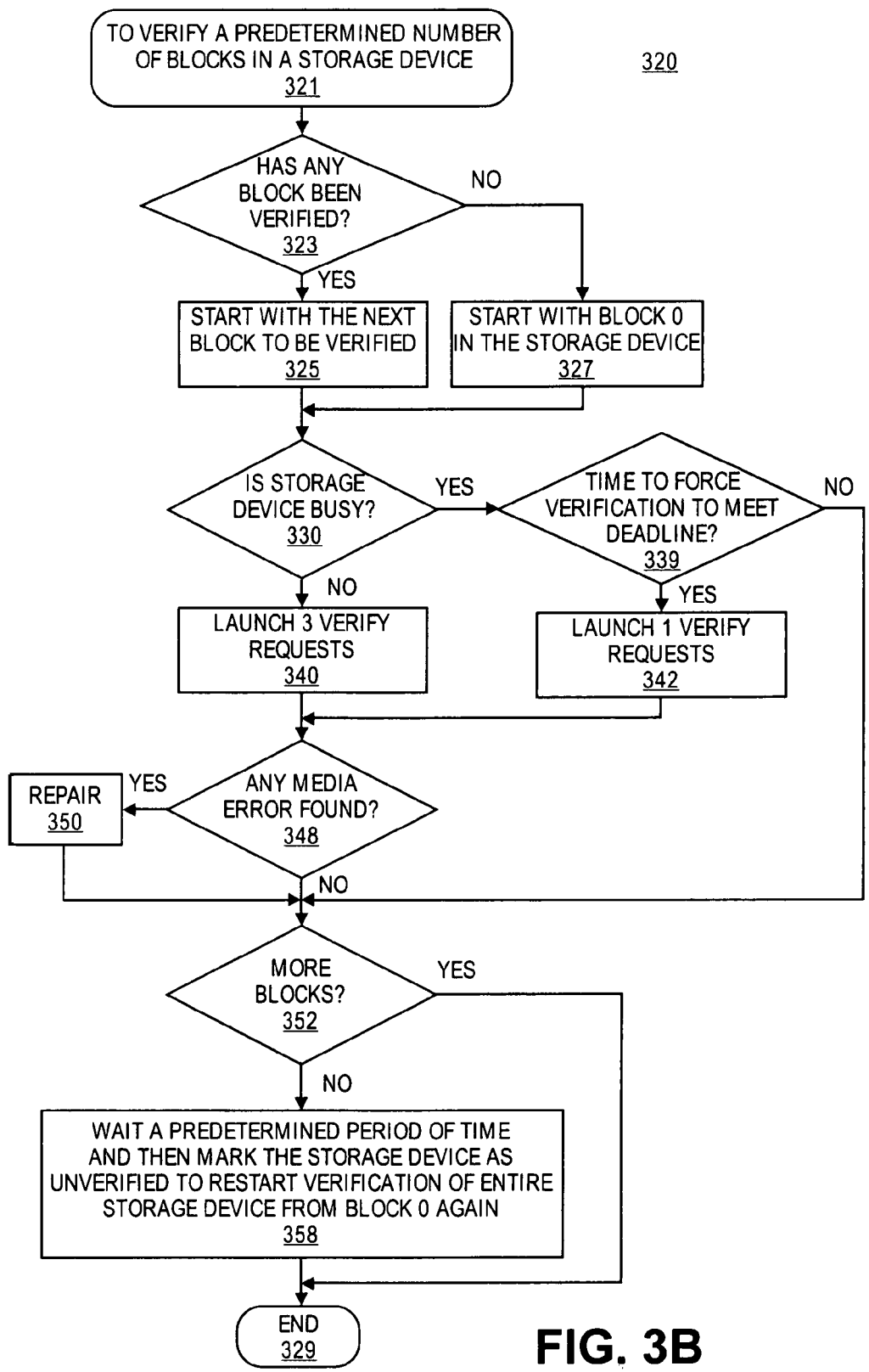
FIG. 3B is a flow diagram of one embodiment of a process to detect media errors on a storage device.

FIG. 3B illustrates one embodiment of a process for detecting media errors on a storage device. The process is performed by processing logic that may comprise hardware (e.g., circuitry, dedicated logic, etc.), software (such as is run on a general-purpose computer system or a dedicated machine, such as the storage server 200 in FIG. 2), or a combination of both. Furthermore, the technique disclosed below is applicable to various types of storage devices, such as FC disks, ATA disks, etc.

Referring to FIG. 3B, processing logic starts to verify a predetermined number of blocks in a storage device in a storage system (processing block 321). Processing logic checks whether any block on the storage device has been verified (processing block 323). If no block on the storage device has been verified yet, processing logic starts with block zero on the storage device (processing block 327). Otherwise, processing logic starts with the next block to be verified (processing block 325).

To verify a block, processing logic performs one or more operations to determine whether a storage device is busy (processing block 330). More detail on how processing logic determines whether the storage device is busy is discussed below with reference to FIG. 3C.

In one embodiment, when processing logic determines that the storage device is not busy, processing logic launches a predetermined number of verify requests in parallel to take advantage of the fact that the storage device is not busy (processing block 340). However, the number of verify requests (e.g., SCSI_VERIFY) to be launched in parallel depends on the type of the storage device. For instance, three 512 kbyte verify requests may be launched on a FC disk. However, for an ATA disk, only one 512 kbyte verify request may be launched even when the ATA disk is not busy.

If processing logic has determined that the storage device is busy, processing logic may check whether it is time to force a verify operation in order to complete verifying the predetermined set of storage devices in the system within the predetermined period, such as 72 hours (processing block 339). If it is time to force a verify operation, processing logic may launch one verify request (processing block 342) to reduce the impact of the verification on the storage device performance since the storage device is busy. Otherwise, processing logic transitions to processing block 352.

After launching the verify request(s) in either processing block 340 or 342, processing logic determines whether there is any media error found on the block (processing block 348). If a media error is found, processing block repairs the block using conventional RAID reconstruction technology (processing block 350). In one embodiment, data on the bad block is reconstructed from the data on other blocks in the error-free storage devices within the same RAID group. However, if the storage device is a spare storage device in the storage system, media error correction on the spare storage device may include writing zeros (also referred to as zeroing) in the blocks having media errors. Processing logic may not reconstruct the spare storage device because there is no data on the spare storage device.

If no media error is found, processing logic may check whether there is another block on the current storage device not yet verified (processing block 352). If there is no more unverified blocks on the storage device, then processing logic waits a predetermined period of time and then marks the storage device as unverified in order to restart verification of the entire storage device from block zero again later (processing block 358). Then the process ends (processing block 329). Otherwise, if there is at least one more block to be verified, the process may be ended (processing block 329) without resetting to block zero to allow processing logic to wait until the next scheduling cycle to verify more blocks on this storage device.

Figure 3C:
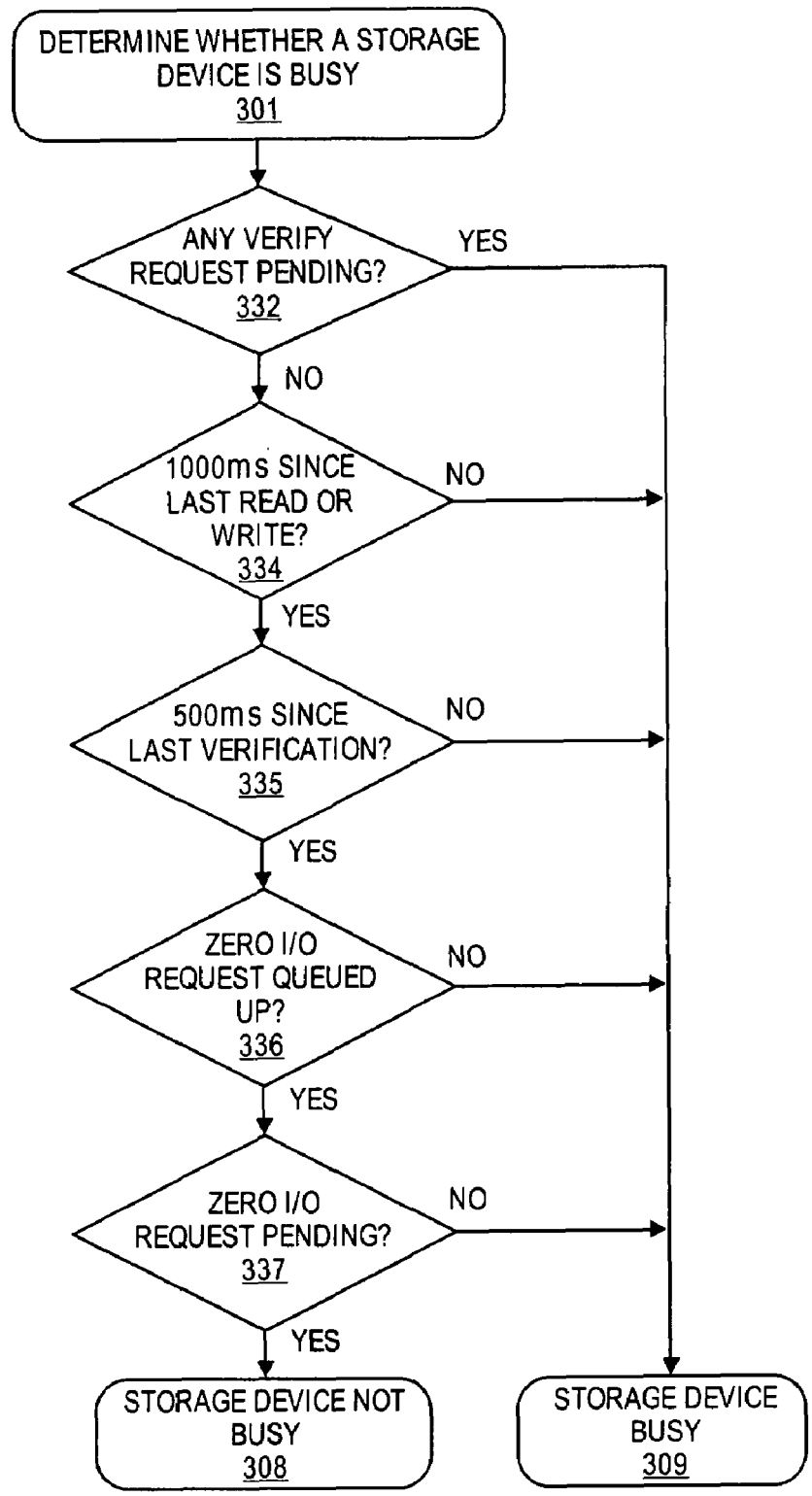
FIG. 3C is a flow diagram of one embodiment of a process to determine whether a storage device is busy.

FIG. 3C illustrates a flow diagram of one embodiment of a process to determine whether a storage device in storage system is busy. The storage device may be coupled to a storage server, which may access the storage device and/or perform various operations on the storage device. The process is performed by processing logic that may comprise hardware (e.g., circuitry, dedicated logic, etc.), software (such as is run on a general-purpose computer system or a dedicated machine, such as a storage server), or a combination of both. For the purpose of illustration, some sample levels or values are provided in the following discussion. But these levels and values should not be taken to limit the present invention as claimed. In some embodiments, the sample checking operations discussed below may or may not be performed in the order illustrated in FIG. 3C.

Since verification does not involve data transfer, processor resources consumed is negligible. Therefore, in some embodiments, processing logic does not check for processor utilization in determining whether the storage device is busy. Instead, processing logic may rely on other indicators to determine whether the storage device is busy. For example, processing logic may determine whether there is any pending verify request (processing block 332). If there is, the storage device may be considered to be busy (processing block 309). Otherwise, processing logic may transition to processing block 333 to continue checking other conditions.

Furthermore, processing logic may determine whether a predetermined period has passed since the last read or write operation (processing block 334). For instance, the predetermined period may be 1000 msec. If the predetermined period has not passed, the storage device may be considered to be busy (processing block 309). Otherwise, processing logic may transition to processing block 335 to continue checking other conditions.

Processing logic may determine whether another predetermined period has passed since the last verify operation (processing block 335). For instance, this predetermined period may be 500 msec. If the predetermined period has not passed, the storage device may be considered to be busy (processing block 309). Otherwise, processing logic may transition to processing block 336 to continue checking other conditions.

Processing logic may determine whether there is any I/O requests queued up (processing block 336). If there is at least one I/O request queued up, the storage device may be considered to be busy (processing block 309). Otherwise, processing logic may transition to processing block 337 to continue checking other conditions.

Processing logic may determine whether there is any I/O request pending (processing block 337). If there is at least one I/O request queued up, the storage device may be considered to be busy (processing block 309). Otherwise, processing logic may determine the storage device to be not busy (processing block 308). Based on whether the storage device is busy, processing logic may dynamically adjust the rate at which the scrub is run. In one embodiment, processing logic may launch fewer verify requests when the storage device is busy. Alternatively, processing logic may simply delay launching the verify requests. Detail of how to dynamically adjust the rate has been discussed above with reference to FIG. 3B.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
   computing a first data rate at or above which a scrub on a plurality of storage devices can be completed within a predetermined period of time; and
   running the scrub on the plurality of storage devices at a second data rate without interfering with the plurality of storage devices servicing client requests to access the plurality of storage devices, the second data rate being at or above the first data rate.

2. The method of claim 1, wherein running the scrub on the plurality of storage devices comprises:
   issuing verify requests from a storage server to the plurality of storage devices to cause the plurality of storage devices to check for media errors.

3. The method of claim 2, wherein the plurality of storage devices check whether data on the plurality of storage devices can be read correctly without transferring the data to the storage server in response to the verify requests.

4. The method of claim 2, wherein the verify requests include Small Computer System Interface (SCSI) verify requests.

5. The method of claim 1, further comprising:
   dynamically changing the second data rate based on whether the plurality of storage devices are busy.

6. The method of claim 1, further comprising:
   dynamically changing the second data rate in response to a volume of the client requests.

7. The method of claim 1, wherein computing the first data rate includes computing the first data rate based on a size of a largest storage device or a size of a predetermined storage device among the plurality of storage devices.

8. An apparatus comprising:
   a storage adaptor to couple to a plurality of storage devices;
   a memory device to store a plurality of instructions; and
   a processor, coupled to the memory device and the storage adaptor, to retrieve the plurality of instructions from the memory device and, in response to the plurality of instructions, to perform a plurality of operations comprising:

managing the plurality of storage devices to service client requests to access the plurality of storage devices;

causing the plurality of storage devices to run a scrub to check for media error on the plurality of storage devices without interfering with the plurality of storage devices servicing the client requests; and computing a first data rate at or above which the scrub can be completed within a predetermined period of time, wherein the scrub is performed at a second data rate, the second data rate being at or above the first data rate.

9. The apparatus of claim 8, wherein causing the plurality of storage devices to run the scrub comprises:

issuing verify requests to the plurality of storage devices.

10. The apparatus of claim 9, wherein the plurality of storage devices checks whether data can be read correctly from the plurality of storage devices without transferring data from the plurality of storage devices.

11. The apparatus of claim 8, wherein the plurality of operations further comprise:

monitoring the client requests to access the plurality of storage devices; and dynamically changing the second data rate in response to a volume of the client requests.

12. A storage system comprising:

a plurality of storage devices;

an interconnect; and a storage server, coupled to the plurality of storage devices via the interconnect, to provide storage service, the storage server comprising:

a memory device to store a plurality of instructions; and a processor, coupled to the memory device, to retrieve the plurality of instructions from the memory device and, in response to the plurality of instructions, to perform a plurality of operations comprising:

computing a first data rate at or above which the plurality of storage devices can be completely scrubbed within a predetermined period of time; and causing the plurality of storage devices to perform a scrub to detect media errors at a second data rate, the second data rate being at or above the first data rate.

13. The storage system of claim 12, wherein the plurality of operations further comprise:

monitoring client requests to access the plurality of storage devices; and dynamically changing the second data rate in response to a volume of the client requests.

14. The storage system of claim 12, wherein causing the plurality of storage devices to perform the scrub comprises issuing verify requests to the plurality of storage devices.

15. The storage system of claim 14, wherein the verify requests include Small Computer System Interface (SCSI) verify requests.

16. The storage system of claim 12, wherein the plurality of storage devices include a Redundant Array of Independent Disks (RAID) group.

17. The storage system of claim 16, wherein the plurality of operations further comprise repairing a storage device if a media error is detected on the storage device during the scrub.

18. The storage system of claim 12, wherein the scrub is substantially continuously performed on the plurality of storage devices.

19. An apparatus comprising:

means for reducing a latency of servicing client requests by a plurality of storage devices when the plurality of storage devices are scrubbed to detect media errors on the plurality of storage devices; and means for ensuring the plurality of storage devices are completely scrubbed within a predetermined period of time, wherein the means for ensuring comprises:

means for computing a first data rate at or above which a scrub on the plurality of storage devices can be completed within the predetermined period of time; and means for running the scrub on the plurality of storage devices at a second data rate without interfering with the plurality of storage devices servicing client requests to access the plurality of storage devices, the second data rate being at or above the first data rate.

20. A method comprising:

scanning a plurality of storage devices in a data storage system to check for errors in the plurality of storage devices; and dynamically adjusting a frequency of the scanning based on a current bandwidth of each of the plurality of storage devices.

21. The method of claim 20, wherein the errors comprise at least one of a media error and a parity error.

22. The method of claim 20, wherein scanning the plurality of storage devices comprises:

issuing verify requests from a storage server to the plurality of storage devices to cause the plurality of storage devices to check for media errors without transferring data from the plurality of storage devices to the storage server.

23. The method of claim 20, wherein scanning the plurality of storage devices comprises:

using a storage server to read data from the plurality of storage devices and to compute a first parity from the data read; and verifying the first parity computed against a second parity read from a storage device designated for storing parities.

24. The method of claim 20, wherein dynamically adjusting the frequency of the scanning comprises:

increasing the frequency of the scanning in response to a drop in client requests to access the plurality of storage devices; and decreasing the frequency of the scanning in response to a rise in client requests to access the plurality of storage devices.

* * * * *